United States Patent
Rasanayagam et al.

(10) Patent No.: US 8,470,383 B2
(45) Date of Patent: Jun. 25, 2013

(54) METHOD AND SYSTEM FOR TREATING FOOD ITEMS WITH AN ADDITIVE AND LIQUID NITROGEN

(75) Inventors: Vasuhi Rasanayagam, Bear, DE (US); David C. Braithwaite, Houston, TX (US)

(73) Assignees: American Air Liquide, Inc., Freemont, CA (US); Air Liquide Industrial U.S. L.P., Houston, TX (US)

( * ) Notice: Subject to any disclaimer, the term of this patent is extended or adjusted under 35 U.S.C. 154(b) by 275 days.

(21) Appl. No.: 12/983,100

(22) Filed: Dec. 31, 2010

(65) Prior Publication Data
US 2012/0171344 A1 Jul. 5, 2012

(51) Int. Cl.
*A23B 4/09* (2006.01)

(52) U.S. Cl.
USPC ........... 426/327; 426/332; 426/335; 426/652; 426/515; 426/519; 426/524; 62/1; 62/64; 62/70; 62/74

(58) Field of Classification Search
USPC ................. 426/524, 515, 327, 332, 335, 652, 426/519; 62/1, 64, 66, 70, 74
See application file for complete search history.

(56) References Cited

U.S. PATENT DOCUMENTS

| | | | | |
|---|---|---|---|---|
| 1,937,832 A | * | 12/1933 | McKee | 423/437.1 |
| 3,068,105 A | * | 12/1962 | Morrison | 62/70 |
| 3,214,928 A | * | 11/1965 | Oberdorfer | 62/63 |
| 3,228,838 A | * | 1/1966 | Rinfret et al. | 34/284 |
| 4,295,346 A | | 10/1981 | Hoffman | |
| 4,350,027 A | | 9/1982 | Tyree, Jr. | |
| 4,655,047 A | * | 4/1987 | Temple et al. | 62/64 |
| 4,843,840 A | * | 7/1989 | Gibson | 62/375 |
| 5,218,826 A | * | 6/1993 | Kirschner et al. | 62/48.1 |
| 5,475,984 A | * | 12/1995 | Fermani et al. | 62/64 |
| 7,781,006 B2 | * | 8/2010 | Brisson et al. | 426/565 |
| 2003/0041602 A1 | * | 3/2003 | Williams, III et al. | 62/64 |
| 2005/0097900 A1 | * | 5/2005 | Giacobbe et al. | 62/64 |
| 2006/0019003 A1 | * | 1/2006 | Take (Xulin Sun) et al. | 426/335 |
| 2010/0293969 A1 | * | 11/2010 | Braithwaite et al. | 62/62 |
| 2011/0120150 A1 | * | 5/2011 | Braithwaite et al. | 62/64 |

FOREIGN PATENT DOCUMENTS

WO WO 2005 082 174 9/2005

OTHER PUBLICATIONS

International Search Report and Written Opinion for PCT/US2011/065527, mailed Feb. 28, 2012.

* cited by examiner

*Primary Examiner* — Drew E Becker

(57) ABSTRACT

A liquid additive is sprayed over liquid nitrogen to form discrete solid particles of the additive in liquid nitrogen. The mixture of additive particles and liquid nitrogen is mixed with a flow of liquid nitrogen at an eductor pump to provide a food treatment composition comprising additive particles. The food treatment composition flows into an interior of food processing equipment to come into contact with food items contained therein.

8 Claims, 1 Drawing Sheet

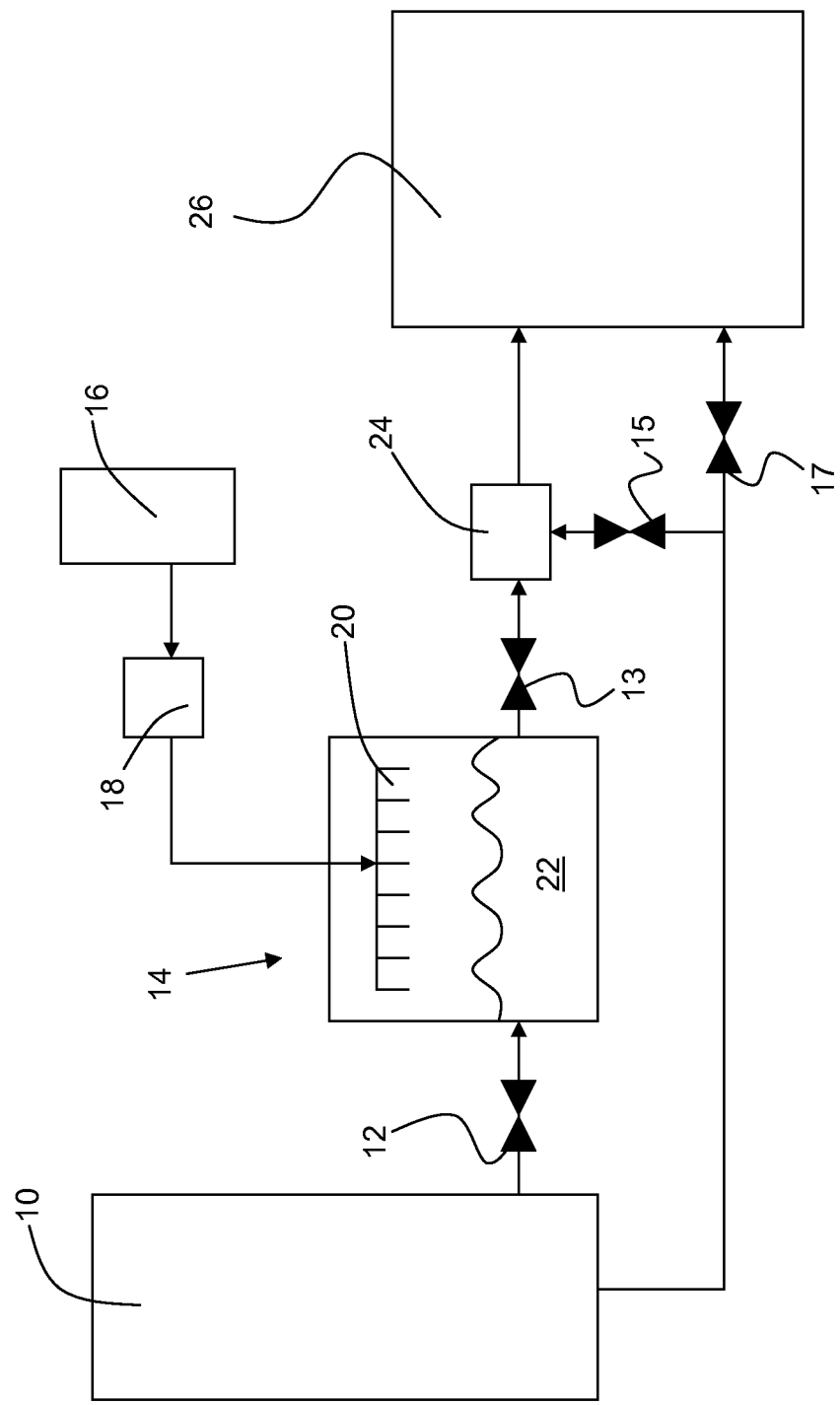

METHOD AND SYSTEM FOR TREATING FOOD ITEMS WITH AN ADDITIVE AND LIQUID NITROGEN

CROSS-REFERENCE TO RELATED APPLICATIONS

None.

BACKGROUND

1. Field of the Invention

The invention relates to the improvement of sanitization techniques used during the processing of food products, more specifically, it relates to the use of liquid nitrogen and an additive for treating food items in an interior of food processing equipment.

2. Description of the Related Art

It's typical for food companies to add additives during processing steps in order to improve the safety, quality and texture of food products. The list of additives for a specific use and approved limits may be any one that is listed as GRAS (Generally Recognized as Safe) by the United States Food & Drug Administration. The additives are classified based on their intended use in food (or) type of chemical compound such as antimicrobial, preservative, colorant, flavor, antioxidants, reducing agents, antifungal agents, antibiotics, oxidative and reducing agents, pH agents, etc. For example, preservatives are static agents that are added to food to inhibit microbial growth and must be non-toxic and safe for human consumption. Salts of organic acids (propionate, sorbate, benzoate and lactate) are preservatives that act by increasing the proton concentration of the cytoplasm of many microbes. In general, antimicrobials and preservatives penetrate the cell membranes and disrupt ATP synthesis in respiring microorganisms. These effects in cellular membrane cause slow growth and negatively impact cell energy. Likewise, each additive has a specific use for addition to food products.

Food safety problems not only originate in the food product itself (e.g., raw ingredients), but also from the environment surrounding the food product. A food product is susceptible to microbial contamination during the processing steps and after the terminal heating process. Operations with poor sanitation in the packing environment can significantly increase the risk of contaminating a food product. For example, pathogenic microorganisms may be found on the floors and in the drains in the packing facility and on the surfaces of sorting, grading, and packing equipment. Without good sanitary practices, any of these surfaces that come in contact a food product could be a potential source of microbial contamination.

According to at least one estimate, post/cross contamination from either environment or food contact surfaces is implicated in up to 30% of food poisoning cases. Post/cross contamination also increases the microbial load in finished products, shortening shelf-life and becoming a visual deterrent of quality. As such, the finished product can serve as a carrier of cross-contamination leading to economic losses, as well as health and survival issues involving consumers. For example, *Listeria* spp is an environmental air-borne pathogen causing listeriosis that can contaminate food products during processing. According to the Center for Disease Control, there were 1850 cases of listeriosis in 1998, including 435 deaths from this disease. Effective methods using sanitizers/disinfectants are crucial to minimize and prevent microbial contamination of foods.

Effective sanitation of food or other items depends on the combination of what is to be sanitized and the sanitation process type. Not all of the currently available technologies can deliver an effective reduction of microorganisms and at the same time prevent product or environmental degradation. It is well known in the art to cool products, such as foods, during processing with some type of refrigerant to slow down the growth of unwanted microbes and enzymatic reactions in foods. For instance, the shelf life and quality of food products are improved by processing, transporting, and storing under refrigerated conditions.

Cooling agents, such as liquid nitrogen, are agents that can be used as expendable refrigerants. Water ice is a traditional expendable refrigerant, but has the disadvantage of converting to water after the ice melts. Liquid nitrogen vaporizes upon absorbing heat from its environment (such as an interior of food processing equipment). The cold temperature of liquid nitrogen and the fact that it leaves no residue like water ice makes it an excellent refrigerant in some applications. For example, when rapid cooling of food products is desired, it can be mixed with liquid nitrogen.

There are many applications that use liquid nitrogen as the coolant to chill and freeze food products (beef, poultry, seafood, etc.) during processing steps. Liquid nitrogen can be injected into various types of equipment involved in food processing such as tumblers, mixers, freezing tunnels, and blenders to effectively refrigerate the equipment for extended periods of time.

Although refrigeration can retard microbial growth, such treatment does not necessarily kill bacteria. Accordingly, microorganisms can still survive through refrigeration, and worse, some microorganisms can still grow and produce harmful substances during refrigerated storage. It is desirable to sanitize equipment and processed foods with a combination of cooling properties found in cooling agents and anti-microbial capabilities of sanitizing agents. It is further desirable to expose the equipment or food product to a cooling agent and sanitizing agent simultaneously.

We have previously described a method for mixing an additive with liquid carbon dioxide for treatment of food items in a food processing equipment. However, when $CO_2$ prices rise to unacceptably high levels or if $CO_2$ availability is low, implementation of that method can be inhibited.

Therefore, there remains a need to provide an improved method for treating and cooling food items that does not rely upon $CO_2$.

SUMMARY

There is provided a method of treating a food item comprising the following steps. A flow of liquid nitrogen is provided to an eductor pump. Liquid nitrogen is fed to a reservoir. A liquid additive is sprayed over a surface of the liquid nitrogen in the reservoir to freeze the additive into discrete particles. A mixture of liquid nitrogen and the additive particles is withdrawn from the reservoir. The withdrawn mixture is fed to the eductor pump. The flow of liquid nitrogen and the mixture is mixed in the eductor pump. A food treatment composition comprising the mixed liquid nitrogen and additive particles is withdrawn from the eductor pump. The food treatment composition is fed to an interior of food processing equipment causing the composition to come into contact with food items contained in the food processing equipment.

There is also disclosed a system for treating a food item, comprising: a tank containing liquid nitrogen; a container containing a liquid additive; a reservoir adapted having an inlet in fluid communication with an outlet of said tank and an outlet; a sprayer in fluid communication with said container and being disposed, adapted and configured to spray the liquid additive over a surface of liquid nitrogen in said reservoir; an eductor pump having inlets in fluid communication with the reservoir outlet and the tank, said eductor pump being adapted and configured to mix a flow of liquid nitrogen from said tank and a mixture of solid particles of the additive with liquid nitrogen from said reservoir; and food processing equipment having an inlet adapted to receive a flow of the mixed liquid nitrogen and solid additive particles from the eductor pump, said food processing equipment being adapted and configured to allow contact between the flow of mixed liquid nitrogen and solid additives and food items contained in said food processing equipment.

The method and/or system may include one or more of the following aspects:

- liquid nitrogen is fed to an interior of the food processing equipment while discontinuing said step of feeding the food treatment composition causing the liquid nitrogen to come into contact with food items contained in the food processing equipment.
- said step of feeding the food treatment composition is alternated with said further step of feeding liquid nitrogen to an interior of the food processing equipment.
- the additive is diluted or dissolved in a diluent or solvent.
- the diluent or solvent comprises a non-aqueous solvent.
- the diluent or solvent comprises water.
- the food processing equipment is selected from the group consisting of: bottom injection mixers; top injection mixers; nitrogen refrigerated cabinet freezers; nitrogen refrigerated tunnels; nitrogen refrigerated spiral tunnels; blenders; marinators; meat choppers; vegetable choppers; auger screws; food transport containers; batch tumblers; and continuous tumblers.
- the food processing equipment is a bottom or top injection mixer and said method further comprises the step of mixing the food product in the food processing equipment interior with the liquid nitrogen and the additive particles.
- the food item is meat.
- the mixture of liquid nitrogen and solid additive particles is in the form of a slurry.
- a metering unit is adapted to meter out a controlled amount of said liquid additive to said sprayer.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

The FIGURE is a schematic of the inventive method and system.

DESCRIPTION OF PREFERRED EMBODIMENTS

The words and phrases used herein should be given their ordinary and customary meaning in the art by one skilled in the art unless otherwise further defined.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the invention generally provide a method and system for treating food items with a food treatment composition comprising liquid nitrogen and solid additive particles. The solid additive particles are formed by spraying the additive in liquid form over liquid nitrogen. The thus-atomized additive is instantly frozen into discrete particles. The resultant mixture of liquid nitrogen and solid particles are then fed to an eductor pump along with a flow of higher pressure liquid nitrogen whereat they are mixed to provide the food treatment composition. The food treatment composition is then introduced into the interior of food processing equipment. The additive can be selected for its physical, chemical or biological properties so that the food treatment composition can provide the food items with a cooling effect and any other effect afforded by additive's properties.

The additive may be any substance suitable for addition to food items or suitable for treating food items. When the food item to be treated is for human consumption, the additive should be one that is considered safe in the country or jurisdiction within which the invention is performed. For example, in the United States, the additive may be any one that is listed as GRAS (Generally Recognized as Safe) by the United States Food & Drug Administration. One of ordinary skill in the art will recognize that new additives may be approved by the food regulatory agency in the country or jurisdiction where the inventions is performed and that the invention may be practiced with such new additive. A non-limiting list of additives includes antimicrobials, flavoring agents, flavor enhancers, intensifiers, emulsifiers, binders, fillers, gelling agents, plasticizers, stabilizers, suspending agents, whipping agents, sweetening agents, colors, enzymes, antioxidants, sequestrants, wetting agents, surfactants, curing and pickling agents, firming agents, fumigants, humectants, leavening agents, processing aids, surface active agents, surface finishing agents, synergists, texturizers, and mixtures thereof. The liquid additive may comprise liquid substances and may be diluted or dissolved with a diluent or solvent. The liquid additive may instead comprise solid substances dissolved or suspended in a solvent or diluent.

Preferably, the liquid additive comprises an antimicrobial compound. Antimicrobial agents are often used to sanitize equipment, provide aseptic environments, and sanitize foods while reducing spoilage of the food product. The reaction of antimicrobial agents with microbial cell structures is often irreversible; therefore, the cells either become attenuated or die. As used in this invention, the term "antimicrobial" means a physical or chemical agent capable of inhibiting or retarding the growth of bacteria to a measurable degree (such as through increased shelf-life) or a physical or chemical agent capable of causing a reduction in the population of bacteria or spores to a measurable degree. Any antimicrobial compound meeting the above definition for "antimicrobial" may be used in practice of the invention. When the food item to be treated is for human consumption, the antimicrobial compound should be one that is considered safe in the country or jurisdiction within which the invention is performed. For example, in the United States, the antimicrobial compound may be any one that is listed as GRAS by the United States Food & Drug Administration. One of ordinary skill in the art will recognize that new antimicrobial compounds may be approved by the food regulatory agency in the country or jurisdiction where the inventions is performed and that the invention may be practiced with such new antimicrobial compound.

In the case of water-soluble additives, the diluent composition will of course include water. Typical examples of water-soluble antimicrobial compounds include potassium nitrite, potassium nitrate, natural lactic acid, lactates, gluconates, lactitol, parabens (derivatives of phenol), and salts of organic acids (such as propionates, sorbates, benzoates and lactates) that are recognized as preservatives. Preferred antimicrobial compounds include potassium gluconate, ammonium lactate, potassium lactate, sodium lactate, sodium lactate powder, and sodium diacetate. Other preferred types of antimicrobial compound useful for practice with invention include parabens, a group of chemicals which are derivatives of phenol. Parabens are widely used as preservatives in the cosmetic and pharmaceutical industries, and are also popular in the meat processing industry. Preferably, the paraben is methyl paraben, sold by The KIC Group (Vancouver, Wash.). When a water-soluble antimicrobial compound is used, the diluent composition may also contain a non-aqueous solvent if desired. Typical examples of a non-aqueous solvent include alcohols, terpenes, or polyethylene glycol. An alcohol is any organic compound in which a hydroxyl group (—OH) is bound to a carbon atom of an alkyl or substituted alkyl group. The general formula for a simple acyclic alcohol is $C_nH_{2n+1}OH$. Food grade ethanol has the advantage of having a relatively low freezing point. Terpenes are another large group of chemicals compounds found in nature that act as effective solvents with low freezing points. One such example is D-limonene, present in orange peel and extracted from the orange skin. Finally, ethylene glycol is a non-toxic liquid with low molecular weight, and is a common ingredient of antimicrobial pharmaceuticals.

A food product is susceptible to microbial contamination during virtually all steps of preparation. While refrigeration can retard microbial growth, such treatment does not necessarily kill bacteria. Additionally, the retarding effect is of course greatly reduced once the chilling is discontinued. Accordingly, microorganisms can still survive through refrigeration, and worse, some microorganisms can still grow and produce harmful substances during refrigerated storage. It is desirable to treat food processing equipment and foods using a combination of the cooling properties of solid carbon dioxide with the microbial growth-inhibiting or killing capability of an additive comprising an antimicrobial compound.

The disclosed method and system may be used with any food product that may be advantageously chilled with liquid nitrogen. Preferably, the food product is any of meat (including beef, pork, and chicken), dairy products, eggs, and formed food products.

In one embodiment, the liquid additive comprises an antimicrobial compound and is the active ingredient found in the food additive MIRENAT-N, manufactured by Vedeqsa Lamirsa Group based in Barcelona, Spain and distributed in the U.S. by A & B Ingredients (Fairfield, N.J.). MIRENAT-N is manufactured from a naturally occurring antimicrobial compound, and its active ingredient is lauric arginate (N-lauroyl-L-Arginine ethyl ester monohydrochloride). The formulation available for sale contains about 10% active lauric arginate and 90% food grade propylene glycol. It is possible to substitute ethanol for propylene glycol as the non-aqueous solvent when using MIRENAT-N. Advantages of using MIRENAT-N may include: minimal modification of original product, low application use dosage, and well known antimicrobial activity. Based on the manufacturer's specifications, MIRENAT-N can be manufactured to be lower than 11% active in ethanol. MIRENAT, either in propylene glycol, or ethanol, when treated with meat or poultry, can lose its efficacy over time, due to enzymatic reactions. Such problems can be overcome by adding other preservatives or antimicrobials to MIRENAT-N.

In the case of an antimicrobial compound, the relative amount introduced to the food items inside the food processing equipment will depend upon the effectiveness of the antimicrobial compound and the duration, extent, and uniformity of exposure between the antimicrobial compound and the food items. One of ordinary skill in the art will recognize that the relative amount of antimicrobial compound may be varied through routine experimentation in order to optimize the process according to the desired results. Also, the relative amount of liquid nitrogen utilized will depend upon the mass of the food items to be chilled, the temperature drop to be achieved, and the heat capacity of the food items. One of ordinary skill in the art will further recognize that the relative amount of liquid nitrogen utilized may also be varied through routine experimentation in order to optimize the process based upon the desired results.

The liquid additive is fed to the sprayer with a metering unit that meters out a controlled amount of the liquid additive. Typically, the metering unit is a liquid pump or a source of high pressure gas. The high pressure gas may be nitrogen from a headspace of a tank containing the liquid nitrogen or an external source of a relatively inert gas, including $CO_2$, $N_2$, and air.

The liquid nitrogen is typically contained in a tank at pressures higher than ambient and its temperature is largely driven by the pressure at which it is maintained. Typically, it is maintained at a pressure of about 80 psi (about 550 kPa). It is fed into the reservoir where a headspace of gaseous nitrogen is maintained over the liquid phase.

Sprayers are well known devices that are widely commercially available and their details need not be recited herein.

The liquid additive is metered to the sprayer of the reservoir at a pressure higher than that of the liquid nitrogen in the reservoir. While it is preferably to maintain the liquid nitrogen at near-ambient pressure in the reservoir in order to enable the use of relatively simple and inexpensive liquid metering devices, the pressure of the liquid nitrogen may be maintained at higher pressures so long as the liquid additive is metered into the sprayer at a pressure higher than that of the reservoir. Upon being sprayed onto the liquid nitrogen in the reservoir, the droplets of liquid additive are instantly frozen into solid particles of additive.

Eductor pumps are also well known devices that are widely commercially available. At the eductor pump, a flow of the liquid nitrogen from the tank is expanded at a venturi. The mixture of solid additive particles and liquid nitrogen are fed into the eductor pump by the vacuum pulled by the venturi. The flow of liquid nitrogen is thus mixed with the mixture of solid additive particles and liquid nitrogen to provide the food treatment composition.

The food treatment composition is then fed to the interior of the food processing equipment. The food processing equipment is selected from the group consisting of: bottom injection mixers; top injection mixers; nitrogen refrigerated cabinet freezers; nitrogen refrigerated tunnels; nitrogen refrigerated spiral tunnels; blenders; marinators; meat choppers; vegetable choppers; auger screws; food transport containers; batch tumblers; and continuous tumblers. Typically, the food processing equipment is a bottom or top injection mixer ordinarily used for injection of liquid nitrogen for cooling.

Introduction of the liquid nitrogen into the interior of the food processing equipment may be carried out with a liquid nitrogen injection nozzle of the type conventionally used in the art. Many of such nozzles are constructed of a heat (and cold) conducting material such as stainless steel. Because of its heat (and cold) conducting properties, it will of course become relative cold due to contact with the liquid nitrogen. As a result, food items with relatively moist surfaces may tend to freeze against the nozzle surface and stick. Over time, this may clog the nozzle, or in the case of food processing equipment that mixes the food items, impede the mixing. In order to reduce the occurrence or extent of this problem, the nozzle may be made of or coated with a heat insulative material and/or a non-stick material. Alternatively, the nozzle may include an insert (made of or coated with the heat insulative material) forming a barrier between the liquid nitrogen and surfaces of the food processing equipment. One of ordinary skill in the art will recognize that non-limiting examples of such a material include those sold under the brand names: Teflon, silicone, UHMW (ultra high molecular weight polyethylene), SilverStone, TFaI, Halon, Fluon, and Debron.

As best illustrated in the FIG, a system is used to treat a food item according to an embodiment of the invention. Liquid nitrogen is contained within a liquid nitrogen tank 10. Upon opening of valves 12, a stream of liquid nitrogen from tank 10 flows to reservoir 14. At the same time, liquid additive from liquid additive container 16 is metered by metering device 18 to sprayer 20. The droplets of liquid additive fall from the sprayer 20 into the liquid nitrogen 22 that is contained in the reservoir 14 underneath a headspace of gaseous nitrogen. The effectiveness of the metering device 18 may optionally be enhanced by pressurizing a headspace of the container 16 with gaseous nitrogen from a headspace of the tank 10.

If the liquid additive has a freezing point higher than the temperature of the gaseous nitrogen in the headspace of the reservoir 14 one of ordinary skill in the art will recognize that the relatively low temperature of the gaseous nitrogen will, to some degree, cool the sprayer 20 and conduit leading from metering device 18 and container 16 such that the additive contained therein may have the tendency to freeze prematurely. In order to ameliorate this potential issue, the sprayer 20 and conduit may be heated with any conventional technique, such as wrapping them with heat tape, encasing the parts in a metal block through which heating elements extend, or providing a hot water jacket around the parts.

Upon the opening of valve 13, liquid nitrogen from tank 10 is feed to an inlet of eductor pump 24. Upon opening of valve 13, a flow of the mixture of liquid nitrogen and solid additive particles from reservoir 14 is fed to another inlet of eductor pump 24. After mixing of the two feeds, the result food treatment composition comprising liquid nitrogen and solid additive particles is fed to an interior of food process equipment 26.

Due to the pressure difference between the food treatment composition fed from eductor pump 24 and the interior of the food processing equipment 26, the composition is caused to be sprayed well into the interior of the equipment 26

Preferably after each batch or run of food items is processed with the liquid nitrogen and additive, the system may be purged of any residual liquid nitrogen or additive (or diluent composition) by flowing high pressure nitrogen gas therethrough from the headspace of the tank 10 or any other high pressure gas from an external source (such as Nitrogen or compressed air).

The disclosed methods and systems provide several advantages. First, by injecting the additive with the liquid nitrogen, the capital cost is lowered because a same set of equipment performs two functions. Second, by combining the additive and liquid nitrogen, we are able to perform two separate process steps (addition of food additives and nitrogen refrigeration) into one process step, thereby reducing processing time and minimizing the mixing cycle. Extended mixing cycles can lead to increased heating of the mixture due to friction and mechanical energy, and also lead to mixture degradation through partial emulsification of the product being mixed. Third, by utilizing an additive without a diluent composition, the liquid nitrogen serves as the sole diluting agent. Thus, the overall operating cost is reduced and an additional step of mixing the additive with a diluent composition is eliminated. Fourth, by utilizing liquid nitrogen and the resulting high pressure stream as a carrier vehicle and dispersant for the additive, the amount of mixing energy and time required to create a homogeneous mix can be reduced. Finally, the system and method provide an alternative to the known $CO_2$/additive technique taught by us in US 20100293969 if $CO_2$ sourcing becomes an issue.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method of treating a food item comprising the steps of:
providing a flow of liquid nitrogen to an eductor pump;
feeding liquid nitrogen to a reservoir;
spraying a liquid additive over a surface of the liquid nitrogen in the reservoir to freeze the additive into discrete particles;
withdrawing a mixture of liquid nitrogen and the additive particles from the reservoir;
feeding the withdrawn mixture to the eductor pump;
mixing the flow of liquid nitrogen and the mixture in the eductor pump;
withdrawing from the eductor pump a food treatment composition comprising the mixed liquid nitrogen and additive particles;
feeding the food treatment composition to an interior of food processing equipment causing the composition to come into contact with food items contained in the food processing equipment.

2. The method of claim 1, wherein the additive is diluted or dissolved in a diluent or solvent.

3. The method of claim 2, wherein the diluent or solvent comprises a non-aqueous solvent.

4. The method of claim 2, wherein the diluent or solvent comprises water.

5. The method of claim 1, wherein the food processing equipment is selected from the group consisting of: bottom injection mixers; top injection mixers; nitrogen refrigerated cabinet freezers; nitrogen refrigerated tunnels; nitrogen refrigerated spiral tunnels; blenders; marinators; meat choppers; vegetable choppers; auger screws; food transport containers; batch tumblers; and continuous tumblers.

6. The method of claim 5, wherein the food processing equipment is a bottom or top injection mixer and said method further comprises the step of mixing the food product in the food processing equipment interior with the liquid nitrogen and the additive particles.

7. The method of claim 6, wherein the food item is meat.

8. The method of claim 1, the mixture of liquid nitrogen and solid additive particles is in the form of a slurry.

* * * * *